(12) United States Patent
Bendov (10) Patent No.: US 7,295,254 B2
(45) Date of Patent: Nov. 13, 2007

(54) SMART AND ACTIVE ANTENNA ARRAY FOR PORTABLE AND MOBILE TELEVISION RECEPTION

(75) Inventor: Oded Bendov, 226 Walt Whitman Blvd., Cherry Hill, NJ (US) 08003

(73) Assignee: Oded Bendov, Cherry Hill, NJ (US)

( * ) Notice: Subject to any disclaimer, the term of this patent is extended or adjusted under 35 U.S.C. 154(b) by 627 days.

(21) Appl. No.: 10/893,844

(22) Filed: Jul. 19, 2004

(65) Prior Publication Data
US 2005/0041152 A1   Feb. 24, 2005

Related U.S. Application Data

(60) Provisional application No. 60/495,307, filed on Aug. 14, 2003.

(51) Int. Cl.
*H04N 5/00* (2006.01)
(52) U.S. Cl. .................................................. 348/836
(58) Field of Classification Search ................ 348/836, 348/725, 731; 342/372; 455/25, 32, 434
See application file for complete search history.

(56) References Cited

U.S. PATENT DOCUMENTS

| | | | | |
|---|---|---|---|---|
| 4,709,409 A | * | 11/1987 | Ma et al. | 455/325 |
| 6,229,486 B1 | * | 5/2001 | Krile | 343/700 MS |
| 6,282,184 B1 | * | 8/2001 | Lehman et al. | 370/342 |
| 6,591,100 B1 | * | 7/2003 | Dent | 455/434 |
| 7,006,040 B2 | * | 2/2006 | Henderson et al. | 342/372 |
| 7,162,273 B1 | * | 1/2007 | Abramov et al. | 455/562.1 |
| 2004/0152415 A1 | * | 8/2004 | Anagnos | 455/25 |

* cited by examiner

*Primary Examiner*—Paulos M. Natnael (57) ABSTRACT

A television receiving apparatus includes a tuner having an input port for image-representative signals, an input port for an external antenna, and an internal or associated external indoor antenna array including at least two electronically integrated antenna-WLNA elements. A processor includes a plurality of RF switches and at least one hybrid, for selectively generating a plurality of signals including sums and differences of signals from said elements. The sums and differences are compared with each other and with the external antenna signal to select the best signal, and that selected best signal is coupled to the input port of the tuner.

11 Claims, 9 Drawing Sheets

ELEVATION PATTERNS OF THE HORIZONTAL DIPOLES IN THE SUM (0°) MODE

ELEVATION PATTERNS OF THE HORIZONTAL DIPOLES IN THE DIFFERENCE (180°) MODE

AZIMUTH PATTERNS OF THE VERTICAL DIPOLES IN THE DIFFERENCE (180°) MODE

AZIMUTH PATTERNS OF THE VERTICAL DIPOLES IN THE SUM (0°) MODE

FIG. 5a

ELEVATION PATTERNS OF THE HORIZONTAL DIPOLES IN THE SUM (0°) MODE

ELEVATION PATTERNS OF THE HORIZONTAL DIPOLES IN THE DIFFERENCE (180°) MODE

AZIMUTH PATTERNS OF THE VERTICAL DIPOLES IN THE DIFFERENCE (180°) MODE

AZIMUTH PATTERNS OF THE VERTICAL DIPOLES IN THE SUM (0°) MODE

FIG. 5b

ELEVATION PATTERNS OF THE HORIZONTAL DIPOLES IN THE SUM (0°) MODE

ELEVATION PATTERNS OF THE HORIZONTAL DIPOLES IN THE DIFFERENCE (180°) MODE

AZIMUTH PATTERNS OF THE VERTICAL DIPOLES IN THE DIFFERENCE (180°) MODE

AZIMUTH PATTERNS OF THE VERTICAL DIPOLES IN THE SUM (0°) MODE

FIG. 5c

ELEVATION PATTERNS OF THE HORIZONTAL DIPOLES IN THE SUM (0°) MODE

ELEVATION PATTERNS OF THE HORIZONTAL DIPOLES IN THE DIFFERENCE (180°) MODE

AZIMUTH PATTERNS OF THE VERTICAL DIPOLES IN THE DIFFERENCE (180°) MODE

AZIMUTH PATTERNS OF THE VERTICAL DIPOLES IN THE SUM (0°) MODE

SMART AND ACTIVE ANTENNA ARRAY FOR PORTABLE AND MOBILE TELEVISION RECEPTION

CROSS REFERENCE TO RELATED APPLICATIONS

This application relates to and claims the benefit of the earlier filing date under 35 U.S.C. 119, of U.S. Provisional Patent Application, Ser. No. 60/495,307 entitled "SMART, ACTIVE AND CONCEALABLE ANTENNA ARRAY FOR PORTABLE AND MOBILE TELEVISION RECEPTION," filed on Aug. 14, 2003.

FIELD OF THE INVENTION

This invention relates to arrays of antenna elements for reception of television signals, and more particularly to such antennas suitable for use inside the television receiver or outside, but associated with, the receiver.

BACKGROUND OF THE INVENTION

Conventional television reception requires an outdoor rooftop or an indoor set-top antenna. This tethered arrangement is unsightly and limits the flexibility of the viewer to move the set about. Some residential communities do not permit installation of rooftop antennas, thereby requiring the use of indoor antennas. For analog television (ATV) received with typical indoor antennas such as loops, monopoles and "rabbit-ears" the picture quality is often very poor, especially if the position of the indoor antenna is not adjusted for the particular channel being watched. For digital television (DTV), which is expected to be the future of wireless television worldwide, reception in urban and suburban locations with typical indoor antennas is either impossible or problematic.

Attempts at designing small and concealed antennas for television reception without loss of performance relative to outdoor antennas have been relatively unsuccessful. U.S. Pat. No. 3,906,506 issued to J. K Verma et al., U.S. Pat. No. 4,342,999 issued to O. M. Woodward et al., and U.S. Pat. No. 4,380,011 issued to R. Torres et al. describe concealed narrow-band loop antennas requiring either switching or tuning to a specific band of frequencies. In the case of the Woodward and Torres patents, an antenna pattern steering control was coupled to the loop antennas.

SUMMARY OF THE INVENTION

A television receiving apparatus according to an aspect of the invention comprises an input port for an external antenna, and a channel tuner having an input port for receiving image-representative signals. The apparatus also includes an array of spaced-apart electronically integrated antenna-WLNA (wideband low-noise amplifier) elements for image-representative radio-frequency received signals. Processing means are coupled to the array for receiving image-representative radio-frequency signals therefrom, and are also coupled to the external antenna input port for receiving external signals therefrom. The processing means including at least one hybrid coupled to the array for generating sum and difference signals from the image-representative radio-frequency signals. The processing means also includes switching means for selecting at least signals combined by the at least one hybrid, and for comparing signals originating from the array with signals applied to the input port for an external antenna, and for selecting that one signal which is superior according to at least one metric, and for coupling the one signal to the input port of the channel tuner.

A television receiving apparatus according to another aspect of the invention comprises a channel tuner including an input port for receiving image-representative signals, and an input port for receiving signals from an external source. The apparatus includes an associated antenna array, which may be one of an internal array and an associated indoor array. The antenna array includes at least two electronically integrated antenna-WLNA elements. A processor includes a plurality of RF switches and at least one hybrid, for selectively generating a plurality of signals including sums and differences of signals from the antenna-WLNA elements, and for comparing the sums and differences with each other and with a signal applied to the input port for receiving signals from an external source, to thereby select the best signal, and for coupling that selected best signal to the input port of the tuner.

An apparatus according to a further aspect of the invention comprises a television display having a diagonal of at least 13 inches, and electronics for providing a display of a received television signal. The electronics includes a channel tuner. A casing surrounds at least a portion of the apparatus including a portion of the display and the electronics. The apparatus further includes at least first and second electronically integrated antenna-WLNA elements. Each of the integrated antenna-WLNA elements includes an output port, and provides substantially minimum noise figure and maximum signal level transfer from the antenna to the output port. Each of the antenna-WLNA elements also includes a bias voltage input port. The integrated antenna-WLNA elements are arranged in an array in which the elements are spaced apart by at least six inches, with the array being concealed within the casing with each of the antenna-WLNA elements affixed to the interior of the casing. A high-speed signal processor interfaces the array with the tuner. The signal processor provides space and polarization diversity reception by use of controlled electronic switches and at least one hybrid capable of combining signals from the output ports of the WLNAs either in-phase or out-of-phase. Control means are provided for electronically controlling bias voltage applied to the bias input port of the WLNAs and for also controlling the states of the electronic switches, to thereby enhance at least one of the quality and reliability of TV reception. An external antenna input port is provided, and means for bypassing signal applied to the external antenna input port around the array and the high-speed signal processor.

DESCRIPTION OF THE INVENTION

The inventor herein has determined that designs shown in the abovecited Verma, Woodward, and Torres patents fail to focus on two important system design criteria. The first such important criterion is that of matching, over the television bandwidth, the antenna's input impedance to the conjugate input impedance of the television receiver's front-end at the front-end's point of minimum noise FIGURE. The second such important criterion is that of providing an antenna array with controlled polarization diversity and space diversity reception by automatically switching individual radiators within the array automatically or manually to attain optimum reception regardless of the physical location of the TV set. For optimum reception, the concealed array must make use of very small, active, broadband antennas designed to minimize the noise FIGURE of the receiver at all TV channels, rather than be made of large loops tuned to maximize the voltage of the tuned loop at the antenna's terminals. The switching of the various active antennas must be such as to provide a multitude of array patterns and polarizations to allow for reception independent of the physical location of the TV set.

The present invention eliminates the requirement for an unsightly outdoor or set-top antenna for reliable over-the-air TV reception. In a previously published paper entitled "DTV Coverage and Service Prediction, Measurement and Performance Indices," published in the September 2001 issue of the IEEE Transactions on Broadcasting, the inventor has described the need for such an invention.

This invention relates to an array of antennas in which each antenna can be very small, being an integral part of a wide-band low-noise amplifier [WLNA]. Such an antenna is known as active antenna. Because each active antenna is very small, an array of several active antennas can be embedded within a television set with screen diagonal of at least 13". The availability of several antennas allows the array to provide electronically controlled space and polarization diversity and pattern steering for improved reception of ATV and DTV signals thus replacing set-top or outdoor antennas.

The antenna array described herein has lower directivity than that of a typical outdoor antenna. Prior to being integrated with the WLNA, each antenna may also have a lower input resistance, which would make efficient transfer all the energy of the intercepted signals to the television set difficult. The loss of directivity relative to an outdoor antenna is more than made up for by the WLNA whose noise figure, when integrated with the antenna, would be much lower than that of a typical TV set. By further designing the WLNA to provide a conjugate impedance match to the antenna's input impedance, the received signal is transferred to the television set with little loss of strength.

The U.S. Federal Communications Commission [FCC] has established the following planning factors for reception of analog television in the UHF band at the edge of coverage [Grade B] with an outdoor antenna 30 feet above ground. For reference, Table I shows the derivation of the FCC planning factors:

TABLE I

| FCC Planning Factors for Rooftop Antennas | |
|---|---|
| Antenna Impedance | 75 ohms |
| Channel Bandwidth | 6 MHz |
| Thermal Noise (dBu) | 2.6 (+) |
| Dipole Factor (dB) | −22 (−) |

TABLE I-continued

FCC Planning Factors for Rooftop Antennas

| | | |
|---|---|---|
| Noise Figure (dB) | 10 | (+) |
| CNR (dB) | 28.4 | (+) |
| Antenna Directivity (dB) | 13 | (−) |
| Line Loss (dB) | 5 | (+) |
| Margin for 90% time availability (dB) | 9 | (+) |
| Required Field Strength (dBu) | 64 | |

From this table it is clear that if the 10 dB noise figure of the receiver could be lowered to 2 dB, the antenna gain of 8 dB (13 dB directivity-5 dB line loss) can be reduced to 0 dB without compromising the required field intensity of 64 dBu. In fact, the FCC table is based on an idealized antenna whose impedance is matched to that of the download cable. In reality, the antenna is mismatched to the download cable and that mismatch causes a substantial increase of the in-situ noise figure of the TV set's tuner. There is no limit to the increase of the noise figure with increased impedance mismatch between the antenna and the tuner, but a reasonable estimate for the in-situ noise figure would be at least 15 dB, thereby actually providing a greater opportunity for trading gain for lower noise figure.

The directivity of a very short monopole antenna is not significantly different from that of a half-wave dipole antenna. For example, a monopole antenna whose length may be only ¼ that of a half-wave dipole antenna has a directivity only −0.4 dB lower than that of the half-wave dipole antenna.

For the invention described herein, the average directivity of the array would be 1.2 dB if the array were constructed from half-wave dipoles. Since it is intended for the array to be constructed from very short linear antennas, the estimated directivity would be 1.2-0.4=0.8 dB. The revised planning factors for analog television reception indoors according to an aspect of the invention are listed in Table II:

TABLE II

Planning Factors for the Present Invention

| | | |
|---|---|---|
| Antenna Impedance | 75 ohms | |
| Channel Bandwidth | 6 MHz | |
| Thermal Noise (dBu) | 2.6 | (+) |
| Dipole Factor (dB) | −22 | (−) |
| Noise Figure (dB) | 2 | (+) |
| CNR (dB) | 28.4 | (+) |
| Antenna Directivity (dB) | .8 | (−) |
| Mismatch Loss (dB) | .8 | (+) |
| Height and Window Penetration Loss (dB) | 9 | (+) |
| Required Field Strength (dBu) | 64 | |

In the above table, Line Loss has been replaced by Mismatch Loss because in the present invention the antenna is an integral part of the WLNA and there is no cable separating the two. Also, the margin for 90% time availability is required only for service near the edge of reception as the defined by the FCC's Grade B contour. The margin is not required within the licensed City Grade area as defined by the FCC. Therefore, in the table above, the margin for 90% time availability was replaced with the expected loss due to the antenna's lower height above ground and the loss due to window penetration. In fact, the edge of the City Grade contour typically extends to 35 miles from the transmitter whereas Grade B, the edge of reception, typically extends to 50 miles from the transmitter. The difference of 14 miles translates to an additional margin of at least 14 dB, for a total of 23 dB within the City Grade contour, due to loss of height and window penetration. Therefore, reception within the City Grade contour using the present invention is feasible even with significant loss due to building penetration and height less than 30 feet above ground for the receive antenna.

The main obstacle to using a short monopole antenna to replace a larger antenna is the difficulty in devising circuits that would allow the power received at the antenna to be delivered to the receiver without substantial reflection back into the antenna. That obstacle can be ameliorated with a properly designed WLNA integrated with the short antenna.

The input impedance of a short monopole can be approximated as:

$$Z = 10\left(\frac{2\pi L}{\lambda}\right) - j\frac{Z_a}{\tan\left(\frac{2\pi d}{\lambda}\right)} \quad (1)$$

where:
$Z_A$ is the characteristic impedance of the antenna;
L is the length of the antenna; and
$\lambda$ is the operating wavelength.

For a monopole, the characteristic impedance is given by:

$$Z_a = 60\ln\left(1.15\frac{L}{d}\right)$$

where d is the diameter of the monopole.

The monopole is by no means the only option or even the preferred option for the short antenna. Examples of short broadband antennas that could be used in the present invention are described by Kin-Lu Wong in "Compact and Broadband Microstrip Antennas," published in 2002 by John Wiley & Sons, Inc.

From the above analysis of antenna directivity and input impedance it should be clear that if Z, the antenna's input impedance, can be conjugate matched with the input of the WLNA, the present invention would provide indoor television reception similar to that available using a consumer-grade outdoor antenna. In addition, the present invention provides space and polarization diversity switching to minimize the degradation to picture quality by undesired reflections from nearby obstructions.

Figure 1:
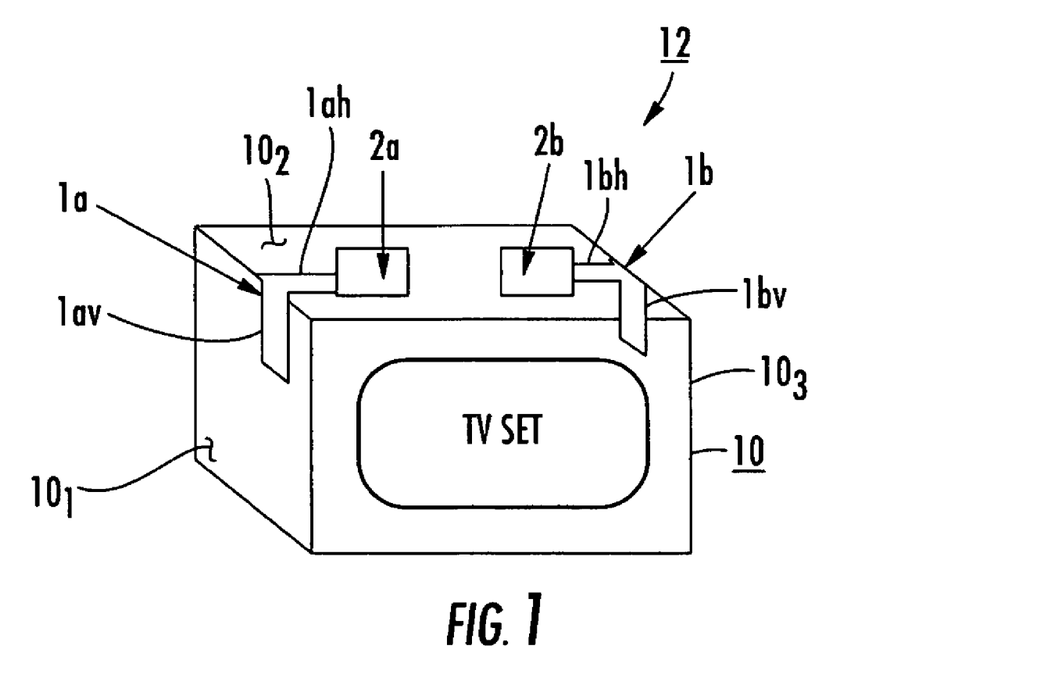
FIG. 1 is a simplified perspective or isometric view of a television receiver showing internal or external locations of the active antennas or antenna elements of a pair of active antennas according to an aspect of the invention.

FIG. 1 illustrates a television receiver 10 including an array 12 made of two integrated antennas 1 and 2. Integrated antenna 1 includes a small L-shaped antenna 1a and 1b, each integrated with, respectively, wideband low-noise amplifiers (WLNA) 2*a* and 2*b*. For each antenna 1*a* and 1*b,* one leg of the "L" of the antenna lies parallel with one planar side of the television 10, and the other leg lies parallel to an adjacent perpendicular side of the television 10. More particularly, a first leg 1*av* of antenna 1*a* is vertically oriented and lies adjacent side 10$_1$, and a second leg 1*ah* is horizontally oriented and lies against upper side 10$_2$. A first leg 1*bv* of antenna 1*b* is vertically oriented and lies parallel with a side 10$_3$ of television receiver 10, and a second leg 1*bh* of antenna 1*b* is horizontally oriented and lies parallel with upper side 10$_2$ of television receiver 10. In array 12 of antennas 1*a* and 1*b*, first and second legs of the antenna 1*a* are parallel with corresponding first and second legs of antenna 1*b*, and more particularly legs 1*ah* and 1*bh* are colinear. Integration of each antenna with its WLNA means that the antenna dimensions and the WLNA circuit were designed as one. The integrated design objectives are that the noise figure of the integrated device and the received power transfer of from the antennas 1*a* and 1*b* to, respectively WLNA 1*a* and 1*b*, are at an optimum for all desired TV channels. The optimum design is a tradeoff between minimizing the noise figure and maximizing the power transfer to the point where no further improvement is advantageous.

Figure 4:
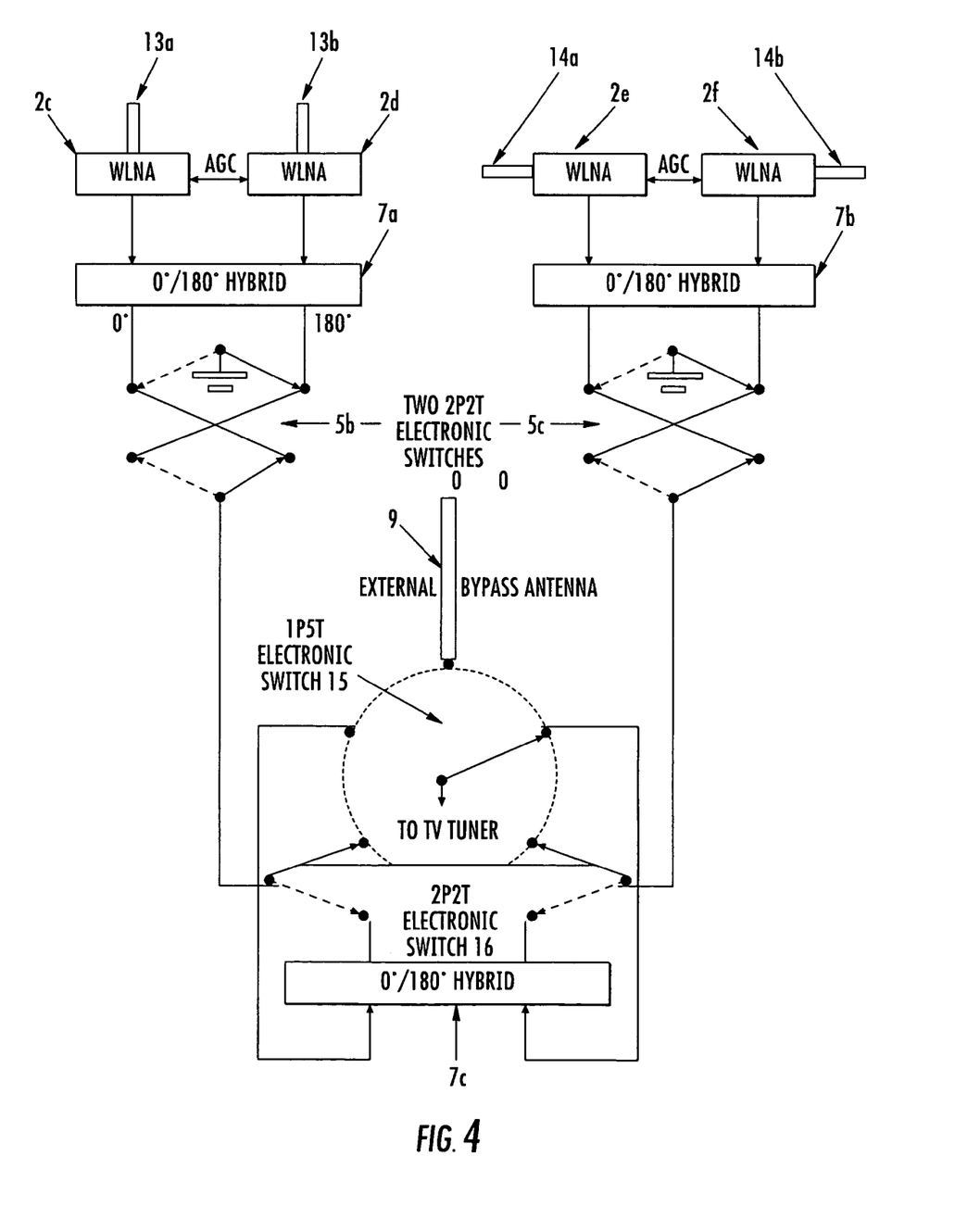
FIG. 4 is a simplified block diagram of connections, control and processing of two pairs of active antennas and television receiver of the arrangement of FIG. 2.
Figure 5A:
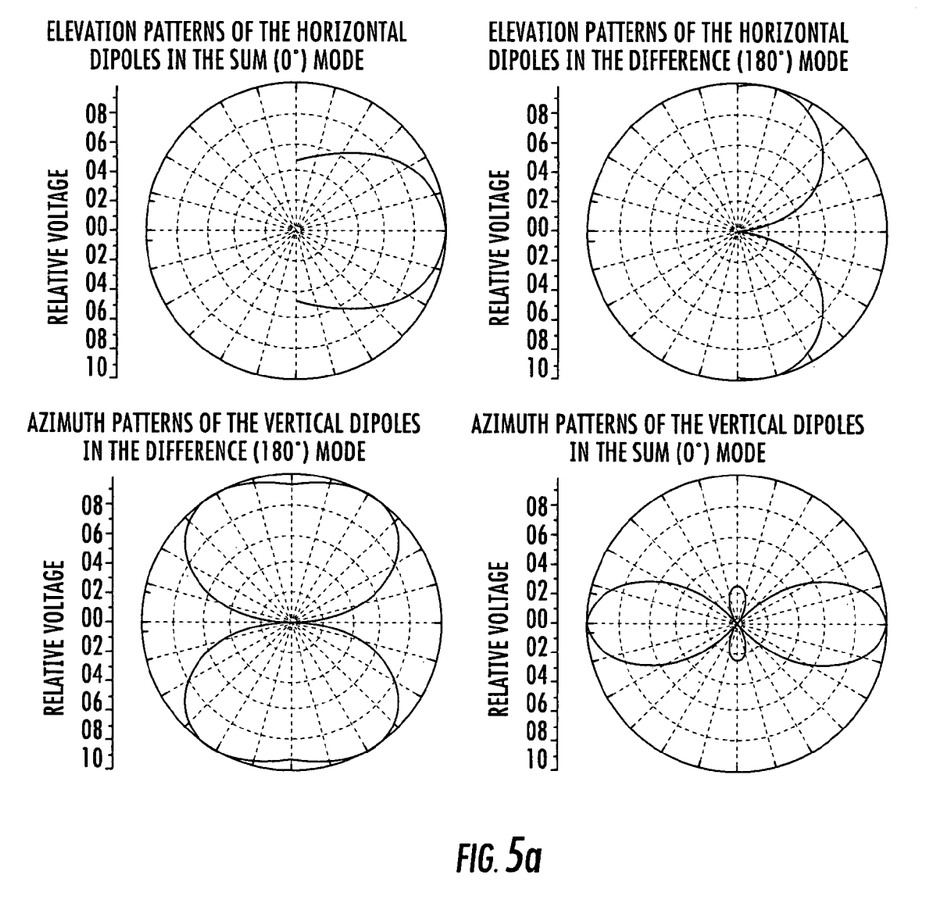
FIG. 5a, upper left, illustrates relative voltage elevation radiation patterns of an array of four horizontal radiation dipoles in the sum (Σ) mode, embedded in a 13" television receiver with a 16×9 aspect ratio screen, FIG. 5a, upper right, illustrates relative voltage elevation radiation patterns of an array of four horizontal radiation dipoles in the difference ()) mode, embedded in a 13" television receiver with a 16×9 aspect ratio screen, FIG. 5a, lower left, illustrates relative voltage azimuth radiation patterns of an array of four vertical radiation dipoles in the difference mode, embedded in a 13" television receiver with a 16×9 aspect ratio screen, FIG. 5a, lower right, illustrates relative voltage azimuth radiation patterns of an array of four vertical radiation dipoles in the sum mode, embedded in a 13" television receiver with a 16×9 aspect ratio screen, FIG. 5b, upper left, illustrates relative voltage elevation radiation patterns of an array of four horizontal radiation dipoles in the sum mode, embedded in a television receiver with a 27", 16×9 aspect ratio screen, FIG. 5b, upper right, illustrates relative voltage elevation radiation patterns of an array of four horizontal radiation dipoles in the difference mode, embedded in a television receiver with a 27", 16×9 aspect ratio screen, FIG. 5b, lower left, illustrates relative voltage azimuth radiation patterns of an array of four vertical radiation dipoles in the difference mode, embedded in a television receiver with a 27", 16×9 aspect ratio screen, FIG. 5b, lower right, illustrates relative voltage azimuth radiation patterns of an array of four vertical radiation dipoles in the sum mode, embedded in a television receiver with a 27", 16×9 aspect ratio screen, FIG. 5c, upper left, illustrates relative voltage elevation radiation patterns of an array of four horizontal radiation dipoles in the sum mode, embedded in a television receiver with a 42", 16×9 aspect ratio screen, FIG. 5c, upper right, illustrates relative voltage elevation radiation patterns of an array of four horizontal radiation dipoles in the difference mode, embedded in a television receiver with a 42", 16×9 aspect ratio screen, FIG. 5c, lower left, illustrates relative voltage azimuth radiation patterns of an array of four vertical radiation dipoles in the difference mode, embedded in a television receiver with a 42", 16×9 aspect ratio screen, FIG. 5c, lower right, illustrates relative voltage azimuth radiation patterns of an array of four vertical radiation dipoles in the difference mode, embedded in a television receiver with a 42", 16×9 aspect ratio screen, FIG. 5d, upper left, illustrates relative voltage elevation radiation patterns of an array of four horizontal radiation dipoles in the sum mode, embedded in a television receiver with a 60", 16×9 aspect ratio screen, FIG. 5c, upper right, illustrates relative voltage elevation radiation patterns of an array of four horizontal radiation dipoles in the difference mode, embedded in a television receiver with a 60", 16×9 aspect ratio screen, FIG. 5c, lower left, illustrates relative voltage azimuth radiation patterns of an array of four vertical radiation dipoles in the difference mode, embedded in a television receiver with a 60", 16×9 aspect ratio screen, and FIG. 5c, lower right, illustrates relative voltage azimuth radiation patterns of an array of four vertical radiation dipoles in the difference mode, embedded in a television receiver with a 60", 16×9 aspect ratio screen.
Figure 5B:
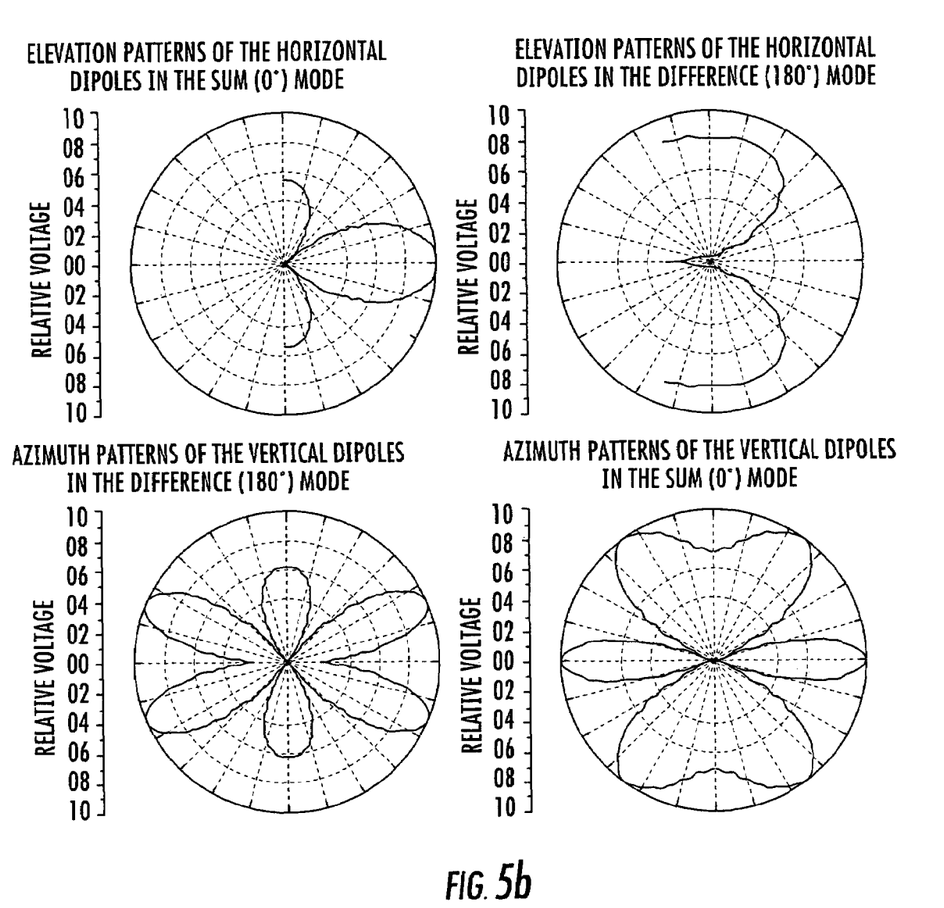
Figure 5C:
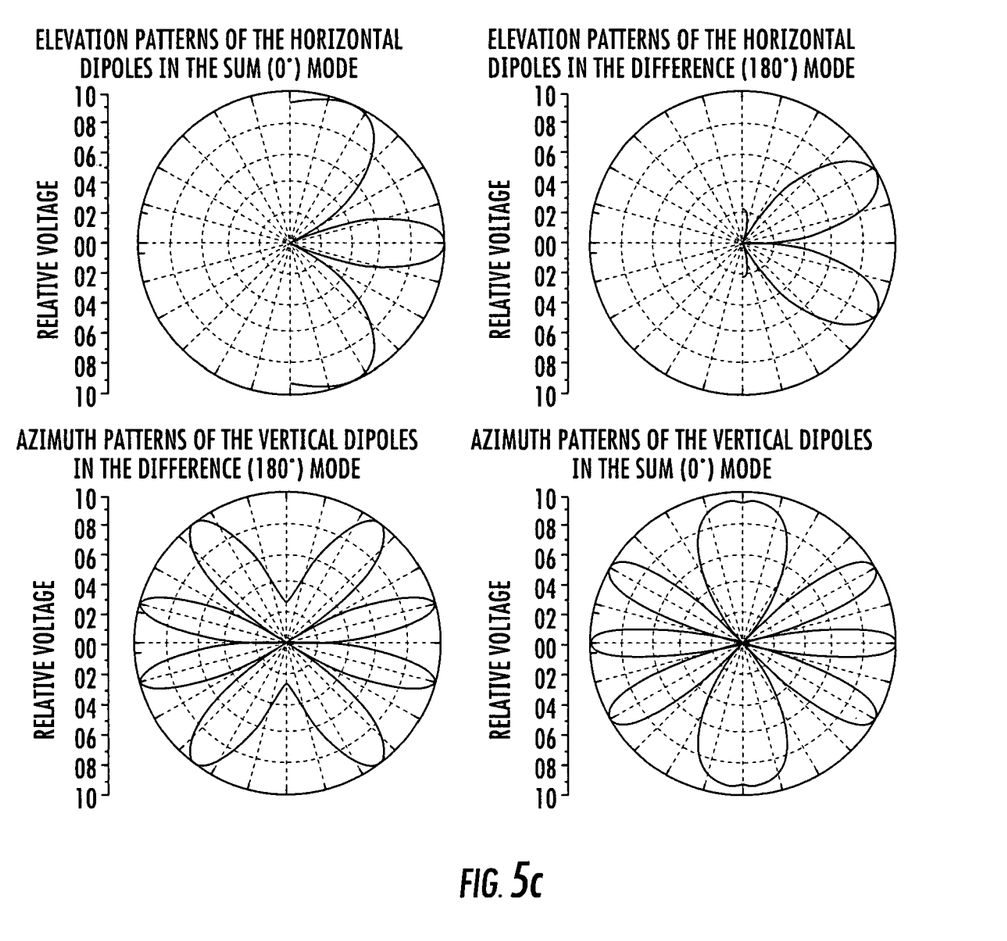
Figure 5D:
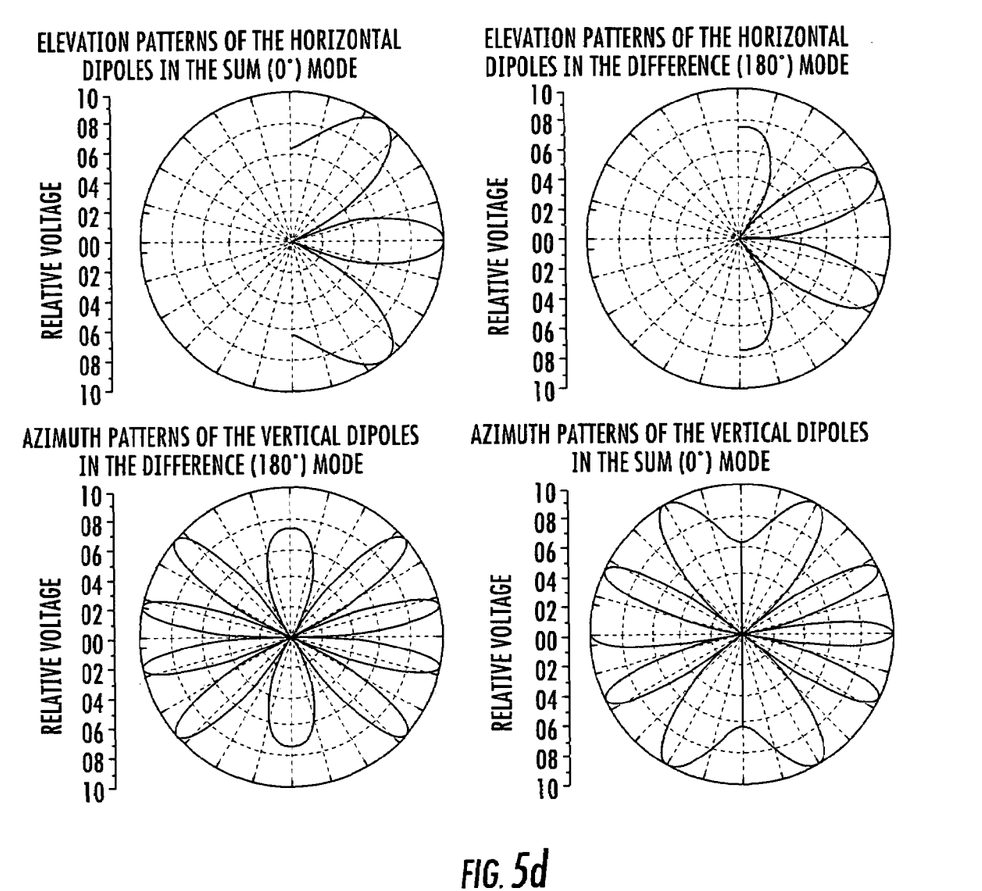

The L-shaped antennas 1*a* and 1*b* illustrated in FIG. 1 are only for explanatory purposes. As an alternative, each antenna might be a straight monopole placed diagonally across a corner of the TV screen or at a corresponding location inside the TV set. An antenna of array 12 may also be a straight monopole placed either horizontally such as 14*a* and 14*b* shown in FIG. 4 or vertically such as 13*a* and 13*b* as shown in FIG. 4. The entire array can be mounted on a frame external to the TV set, or could be mounted internally, so long as the construction of the television cabinet allows passage of electromagnetic radiation. The array, if on a separate frame, could be hung upon a wall or on a car's window. The important points are that each antenna is designed and constructed with one WLNA to form an integrated device, and that at least two such devices form an array capable of diversity reception from within a TV set or from its immediate vicinity.

Each WLNA 2*a* or 2*b* of FIG. 1 could be configured as either a single amplifier or dual balanced amplifiers. The dual balanced configuration provides for improved impedance match between the WLNA and the antenna and for reduction of undesired noise in the form of 3$^{rd}$ order intermodulation components. Description of the dual balanced configuration can be found in "Balanced LNA Suites," by I. Piper et al., published in Microwaves & RF magazine, April 2002 and also in "An Amplifier Linearization Method Based on Quadrature Balanced Structure," by A. Podcameni et. al., published in IEEE Transaction on Broadcasting, June 2002.

Figure 3:
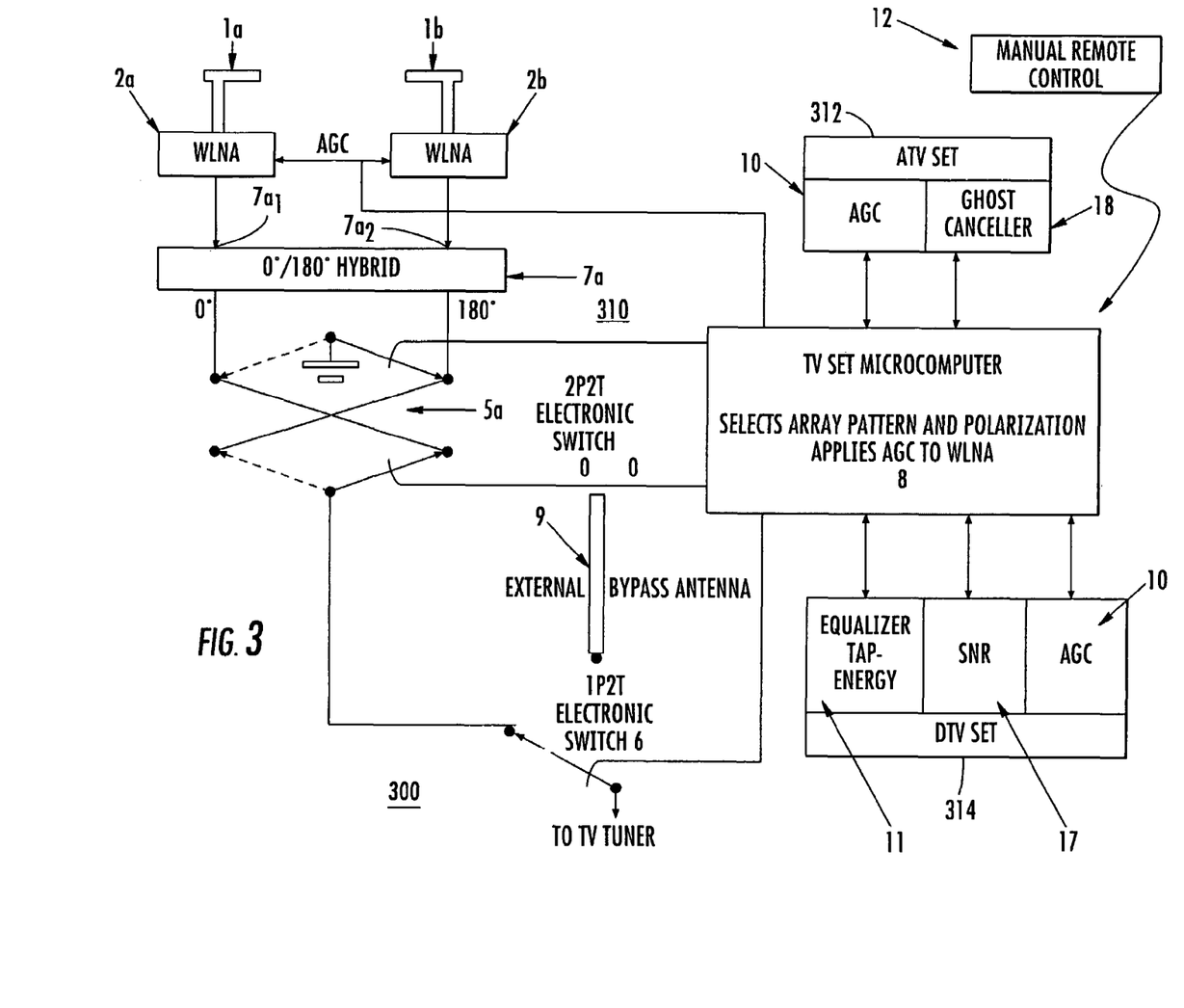
FIG. 3 is a simplified block diagram of connections, control and processing of the pair of active antennas and television receiver of the arrangement of FIG. 1.

The integrated antenna devices 1*a*, 2*a* and 1*b*, 2*b* of FIG. 1 are connected to a high-speed signal processor 310, as illustrated in the embodiment of a television receiver or set 300 of FIG. 3. The signal processor 310 provides for reception pattern diversity that maximizes the level of the desired signal and minimizes the level of undesired signals intercepted by the array. The high-speed signal processor shown in FIG. 3 includes an electronic double-pole, double-throw (DPDT) switch 5*a* and an electronic single-pole, double-throw switch 6, a hybrid 7*a* and a microprocessor or microcomputer controller 8. One purpose of controller 8 is to regulate the bias voltage to WLNAs 2*a* and 2*b* in areas of strong signals, because, unless properly biased, the WLNAs 2*a* and 2*b* may generate undesired signals. The signals received by the antennas 1*a* and 1*b* are amplified by the WLNAs 2*a* and 2*b* and are then applied to input ports 7*a*1 and 7*a*2 respectively, of hybrid 7. The hybrid 7 processes the incoming signals into two distinct outputs. One output provides the sum vector (0°) of the two input signals and the other output provides the difference vector (180°) of the two input signals. While electronic switch 5*a* shown in FIG. 3 is a double-pole, double-throw switch, a single-pole double-throw (SPST) switch could have been used too, but the DPDT switch allows for automatic grounding or termination of the unused one of the output ports 0° or 180° of hybrid 7.

The choice of array pattern of antennas 1*a* and 1*b* made through selection of the positions of electronic switches 5*a* and 6 of FIG. 3, and selection of the bias voltage to WLNAs 2*a* and 2*b*, can be controlled either manually or automatically by the controller 8. For automatic control of digital television several metrics are available, and the most likely candidates are automatic gain control (AGC) controlled by an AGC circuit 10 of analog television (ATV) 312, signal-to-noise ratio (SNR) determined by a processor 17 of digital television (DTV) receiver 314, and equalizer tap energy (ETE) established by a processor 11. The automatic gain control (AGC) circuit 10 of the TV receiver or set provides control voltage proportional to the level of the received signal. The signal-to-noise ratio (SNR) and equalizer tap energy (ETE) circuit 11 of the TV set provide control signals related to the level of desired to undesired signals within the received channel. Switches 5*a* and 6 may also be controlled manually by providing the hand-held remote 12 used to control the receiver 300 of FIG. 3 (or a TV/VCR/DVD combination) with the ability to communicate with controller 8. A combination of automatic and manual control will be particularly suitable for analog TV (ATV) wherein the signal level will be automatically set but the optimum picture quality will be subjectively set by the viewer using the remote.

In FIG. 3, DPDT switch 5*a* selects for use either the sum or difference signal produced by hybrid 7*a*. If the signal processor 310 cannot provide improved performance over that available on a signal path or cable 9, the processor is bypassed via SPST electronic switch 6. The signal applied to television 300 by path 9 will generally be from an antenna external to the television, as for example an outdoor antenna. If the signal processor cannot provide improved performance, the signal intercepted by the external or bypass antenna 9 is fed directly to the tuner (not explicitly illustrated) of the TV set 300 by way of SPST switch 6.

It is well known to those familiar with TV technology that a sufficiently strong signal does not in itself guarantee a high quality picture. The high-speed processor described in FIG. 3 allows for simultaneous adjustment and control of the signal level and the viewed picture quality.

Figure 2:
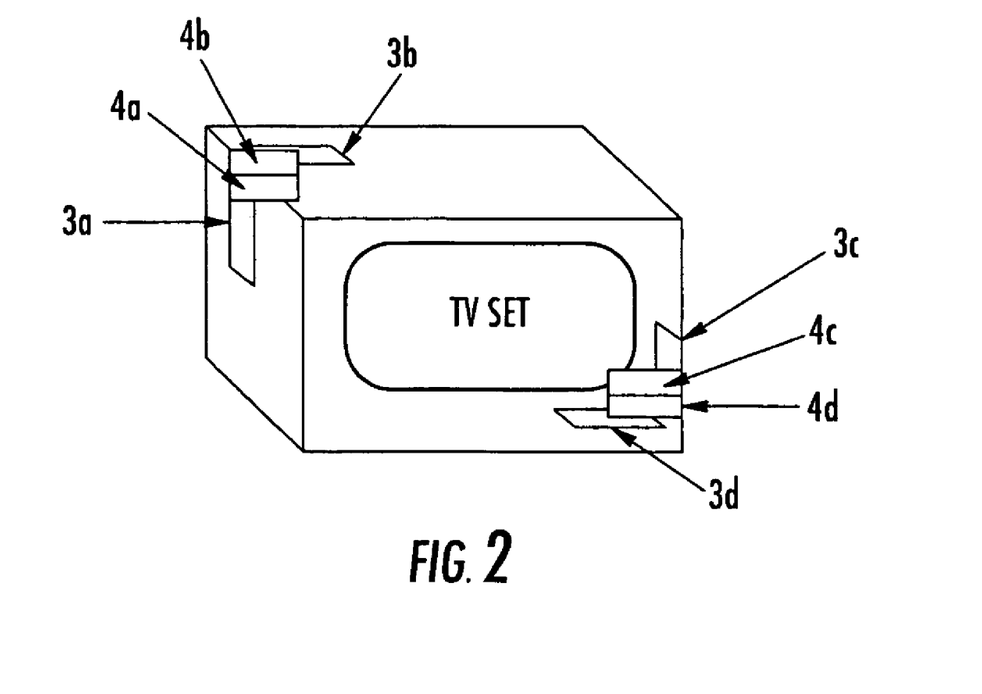
FIG. 2 is a simplified perspective or isometric view of a television receiver showing the internal or external locations of the active antennas or antenna elements of two pairs of active antennas according to another aspect of the invention.

Another implementation of the present invention, made of an array of four integrated devices, is illustrated in FIG. 2. In FIG. 2, each element of the antenna array includes both a vertically polarized integrated antenna-WLNA and a horizontally polarized integrated antenna-WLNA. More particularly, the first array element of the arrangement of FIG. 2 includes a first vertically disposed antenna 3*a* integrated with a WLNA 4*a* and a first horizontally disposed antenna 3*b* integrated with a WLNA 4*b*. The second array element of the arrangement of FIG. 2 includes a second vertically disposed antenna 3*c* integrated with a WLNA 4*c* and a second horizontally disposed antenna 3*d* integrated with a WLNA 4*d*. This array is more complex and expensive than the array of two integrated devices, but, together with the signal processor shown in FIG. 4, is expected to provide improved reception due to additional diversity reception.

Referring to FIG. 4, thirteen diversity states are available via three DPDT switches 5b, 5c, and 16, one single-pole, five-throw (SP5T) switch 15 and three identical hybrids 7a, 7b, 7c, each of which outputs the sum (0°) and difference (180°) of its applied input signals. The twelve diversity states or signals available for application to the television tuner are:

A=Vector sum of the signals of vertical antennas 13a and 13b;
B=Vector difference of the signals of the vertical antennas 13a and 13b;
C=Vector sum of the signals of horizontal antennas 14a and 14b;
D=Vector difference of the signals of the horizontal antennas 14a and 14b;
A+C;
B+D;
A+D;
B+C;
A−C;
B−D;
A−D;
B−C; and bypass antenna 9. The electronic switches 5b, 5c, 15 and 16 of FIG. 4, and the bias voltage applied to WLNAs 2c, 2d, 2e, and 2f can be controlled manually, or automatically by controller 8 as described in conjunction with FIG. 3.

The various sum and difference elevation and azimuth patterns generated by the switches shown in FIG. 4 are plotted in FIGS. 5a, 5b, 5c, and 5d. In general, there are two sets of dipoles, each set comprising two dipoles; one set is for incoming horizontal polarization and one set is for incoming vertical polarization waves. More particularly, the plots of FIGS. 5a, 5b, 5c, and 5d, are linear-voltage plots of the response of arrays of integrated antenna-WLNA fitted to the case or cabinet size of 16×9 aspect ratio, 13-inch (13"), 27", 42", and 60"screen-size television receivers. In the elevation radiation patterns of FIGS. 5a, 5b, 5c, and 5d, the zenith angle (θ) is 0°. In general, the sum-mode elevation patterns (upper left plots of FIGS. 5a, 5b, 5c, and 5d) for all screen sizes exhibit a peak at θ=90°, which is toward the horizon. By contrast, the difference-mode elevation patterns (upper right plots of FIGS. 5a, 5b, 5c, and 5d) exhibit a null at θ=90° or the horizon. The azimuth radiation patterns (the lower left and lower right plots) of FIGS. 5a, 5b, 5c, and 5d have nulls at some azimuth angles and peaks at other azimuth angles. The radiation patterns in FIGS. 5a, 5b, 5c, and 5d show that space and polarization diversity reception is feasible for arrays of four active antennas, whether concealed inside the TV set or mounted on a frame external to the TV set. In particular, FIGS. 5a, 5b, 5c, and 5d show that in the difference mode a reception null is provided at elevation angle of 90° in all azimuth directions. The reception null allows for discrimination against undesired signals.

The methods for integrating the antenna with the WLNA for purposes of optimizing the SNR of the combination are well known. For example, a paper by L. Harter titled "LNA Matching Techniques for Optimizing Noise Figure" was published in the February 2003 issue of RF Design magazine. U.S. Pat. No. 5,914,640 issued Jun. 22, 1999 in the name of G. N. Nasserbakht describes a method for matching the antenna's impedance to that of the amplifier's impedance using an active component.

Figure 6:
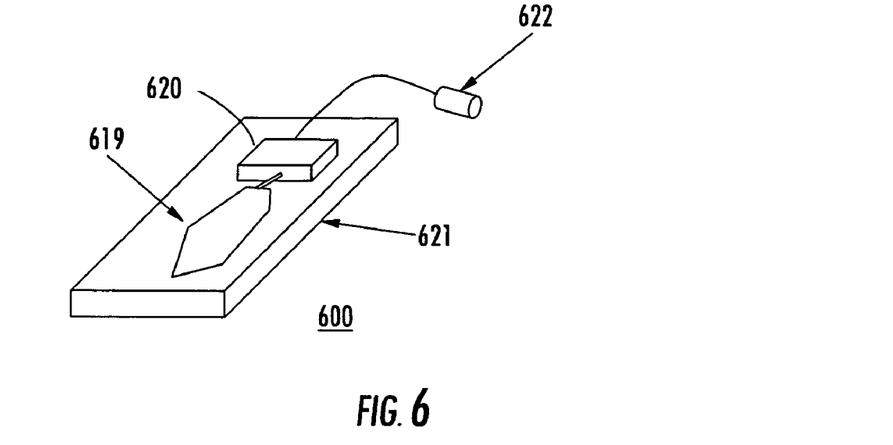
FIG. 6 is a simplified perspective or isometric view of an antenna integrated with a wideband low-noise amplifier on a dielectric substrate board.

FIG. 6 is a simplified perspective or isometric view of an integrated antenna-WLNA according 600 to an aspect of the invention. In FIG. 6, the antenna portion 629 of the integrated antenna-WLNA 600 is electronically integrated with WLNA 620 and the integrated antenna-WLNA is physically mounted onto a dielectric circuit board 621. The material of the dielectric board may be FR4, and its size, depending upon the TV screen size and on the desired channels, may vary from approximately 9"×2" to approximately 16"×3". The physical size is not critical so long as the array of two to four antenna-WLNA elements can be fitted either inside or to the exterior of the case of the TV set. The shape of antenna 619 on substrate board 621 is flat, but not necessarily narrow. The WLNA 620 is adjacent or next to antenna 619, all on substrate board 621. The output port of WLNA 620 is illustrated as a connector 622, which can be coupled to the high-speed processor 310 of FIG. 3 or, alternatively, to a channel tuner.

Figure 7:
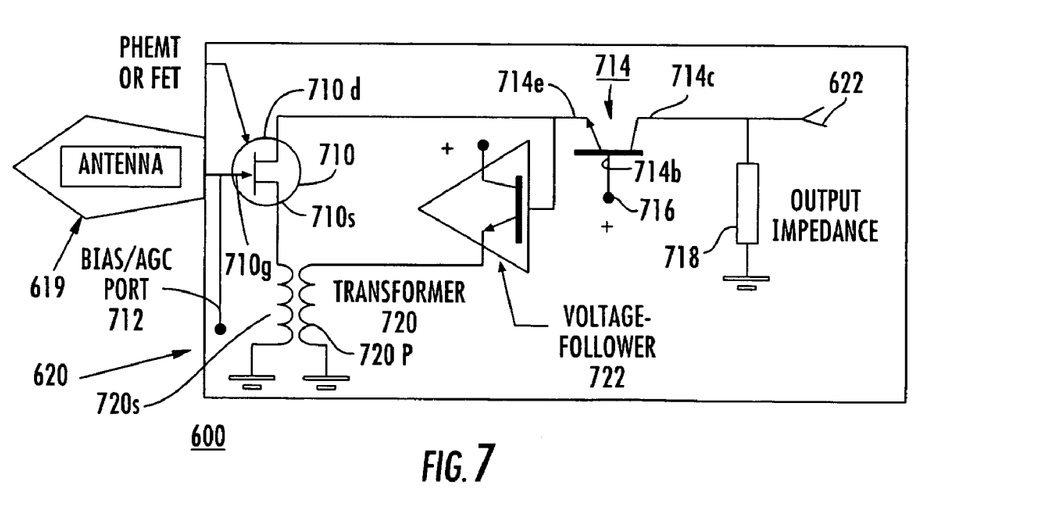
FIG. 7 is a simplified schematic diagram of a wideband low-noise amplifier integrated with an antenna according to an aspect of the invention.

FIG. 7 illustrates details of a preferred embodiment of an integrated antenna-WLNA such as 600 of FIG. 6. In FIG. 7, the antenna portion is designated 619, and the WLNA as 620. As illustrated in FIG. 7, integrated antenna-WLNA 600 of FIG. 7 includes a low-noise active amplifying device illustrated as a FET (field-effect transistor) or PHEMT (pseudomorphic high electron mobility transistor) including source, drain, and gate electrodes 710s, 710d, and 710g, respectively. The proximal end of antenna portion 619 is coupled to gate 710g. A port 712 is coupled to gate 710g for application of bias to the FET 710. FET 710 is coupled in a cascode arrangement with a further active device illustrated as a bipolar transistor 714. Transistor 714 includes an emitter 714e, base 714b, and collector 714c. In the cascode arrangement, the drain 710d of FET 710 is connected to the emitter 714e of transistor 714, and the collector 714c of transistor 714 is coupled to signal output port 622. The output impedance of transistor 714 is represented by a resistor 718. Degenerative signal feedback is applied around FET 710 by a transformer 720 including a primary winding 720p and a secondary winding 720s. A voltage follower 722 is coupled to the drain 710d of FET 710 for producing a low-impedance version of the drain signal voltage, which is coupled to the primary winding 720p of transformer 720. The signal is coupled from primary winding 720p to secondary winding 720s, which is coupled in series with between the source 710s and reference potential or signal ground. The transformer is poled for degenerating the signal. A detailed analysis and description of WLNA 620 is provided in an article "Concept of Transformer-Feedback Degeneration of Low-Noise Amplifiers," by A. Tasic et al., published in the Proceedings of the IEEE International Symposium on Circuits and Systems (ISCAS), Bangkok, Thailand, 25-28 May, 2003, ISBN 0-7803-7762-1.

In general, the microcomputer of the TV set controls switches 5a, 5b, 5c, 15, and 16 of FIG. 4 by first establishing a tuning table for all receivable channels. The parameters used to establish the tuning table are SNR and equalizer tap energy. Standard chips provide the SNR and equalizer tap energy. For example, Oren Semiconductor's type #OR43300 Video Ghost Canceller/Adaptive Equalizer can provide the parameters for ATV channels and Oren Semiconductor's type #OR51219 Digital TV VSB (vestigial sideband) Demodulator can provide the parameters for DTV channels.

Figure 8:
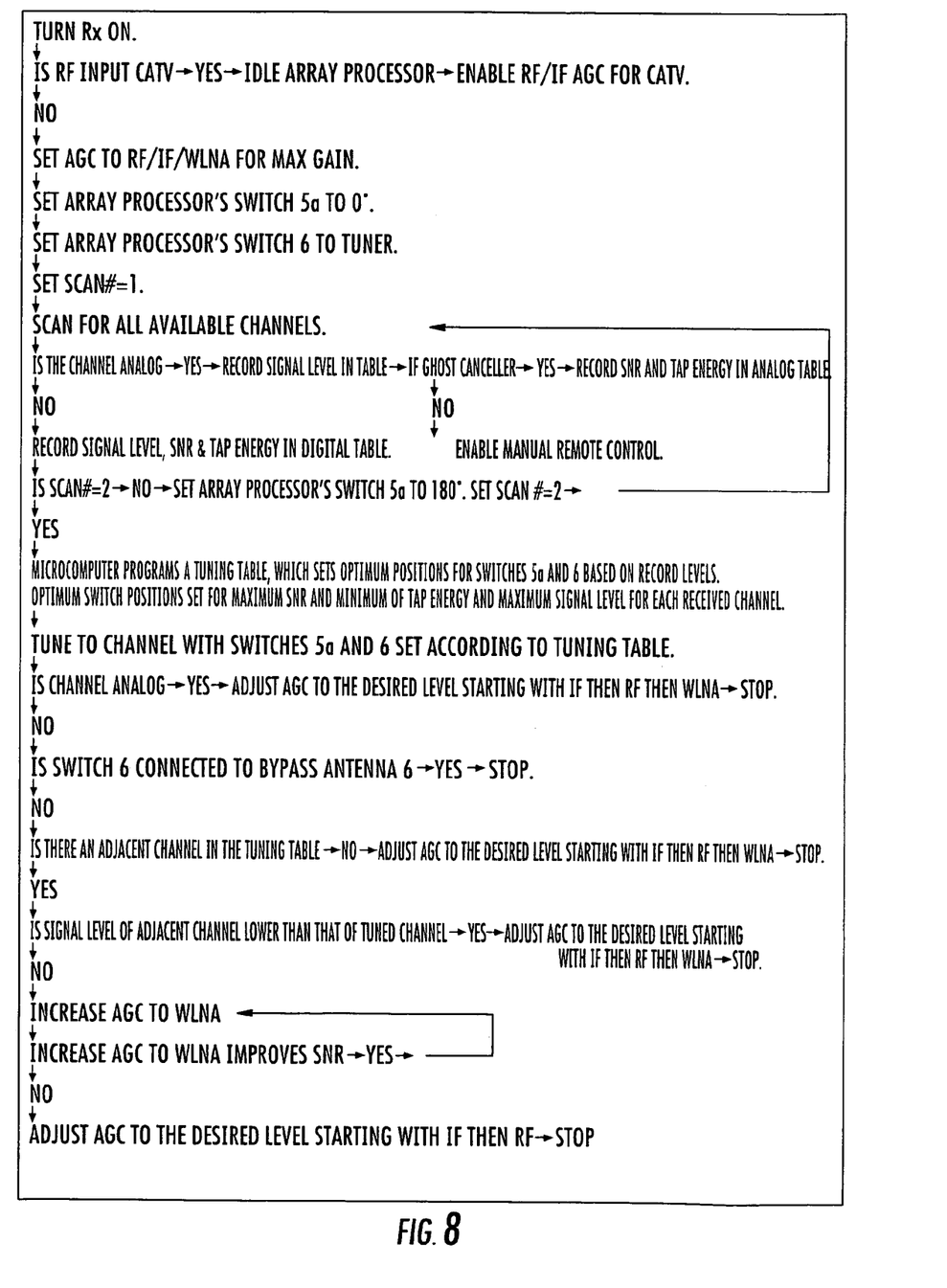
FIG. 8 illustrates an algorithm for array processor control by microcomputer.

FIG. 8 tabulates or sets forth the steps of an algorithm for control of the array by the microprocessor 8 (FIG. 3). As set forth in FIG. 8, the algorithm begins when the receiver (RX) is turned ON. The nature of the input signal is determined, and if the RF input is from a cable television system (CATV) the array processor (310 of FIG. 3) is turned OFF, and the RF/IF AGC is enabled for CATV. If the input is not from CATV, the AGC for RF, IF, and WLAN is or are set for maximum gain. The logic then flows to a state in which array processor switch 5a (FIG. 3) is set to 0° and switch 6 is set to the tuner position. A scan index is set to unity, and scanning is performed to identify all available channels. For each channel, if the channel is analog, at least the signal level, and, if relevant, the ghost canceller, SNR, and tap energy are recorded. If an analog channel is not available but a digital channel is available, the corresponding information for the digital channel is recorded.

Following the recording of information for either an analog or digital channel in the algorithm of FIG. 8, the scan index is reviewed, and updated to represent scan number two, concurrently with the setting of of array processor switch 5a to 180°. If the signal is from a CATV system, the AGC is set to "normal." And the processing ends. Otherwise, the AGC is set for maximum gain of all stages, and all over-the-air channels are scanned for signal availability, and as many as three parameters or metrics are recorded for each channel, such as SNR, AGC, or tap energy, although the system can work with only one.

At the end of the first scan in FIG. 8, a table is recorded in read-only memory (ROM) for all available channels with the switches in their initial positions. During the second scan, the switches are set to a second state, and all metrics are again recorded for each channel. At the end of multiple scans with all possible switch positions or state combinations the table identifies the best switch position combination for each channel, and that selection of switch positions is selected for the channel currently tuned to in off-the-air viewing mode. Thus, the scanning operation according to FIG. 8 is performed once only unless the set location or position is changed, or unless new stations or channels become available.

After the tables of parameters are generated, the AGC is applied normally for control of gain each time a channel is tuned or selected.

The extension of the algorithm of FIG. 8 to the control of the high-speed signal processor of FIG. 4 will be apparent to those skilled in the art. More particularly, the channel scanning for signal levels, SNR and equalizer tap energy are performed for each of the twelve diversity states rather than for the two states of the arrangement of FIG. 3.

Those skilled in the art will recognize that the algorithm of FIG. 8 is only one of a nearly infinite number of ways to perform the set-up function for the antenna array(s), and that other algorithms can perform equivalent procedures.

The invention claimed is:

1. Apparatus comprising:
   a television display having a diagonal of at least 13 inches;
   electronics for providing a display of a received television signal, said electronics including a channel tuner;
   a casing surrounding at least a portion of said apparatus including a portion of said display and said electronics;
   at least first and second electronically integrated antenna—Wideband Low Noise Amplifier elements, each of said integrated antenna—Wideband Low Noise Amplifier elements including an output port, and providing substantially minimum noise figure and maximum signal level transfer from said antenna to said output port, each of said antenna—Wideband Low Noise Amplifier elements also including a bias voltage input port;
   said integrated antenna—Wideband Low Noise Amplifier elements being arranged in an array in which said elements are spaced apart by at least six inches, said array being concealed within said casing with each of said antenna—Wideband Low Noise Amplifier elements affixed to the interior of said casing;
   a high-speed signal processor interfaced between said array and said tuner, said signal processor providing space and polarization diversity reception by use of controlled electronic switches and at least one hybrid capable of combining signals from said output ports of said Wideband Low Noise Amplifiers either in-phase or out-of-phase;
   control means for electronically controlling bias voltage applied to said bias input port of said Wideband Low Noise Amplifiers and also controlling the states of said electronic switches, to thereby enhance at least one of the quality and reliability of TV reception;
   an external antenna input port; and
   means for bypassing signal applied to said external antenna input port around said array and said high-speed signal processor.

2. Apparatus according to claim 1, wherein said control means automatically controls said voltage applied to said bias input port of said Wideband Low Noise Amplifiers automatically through stored instructions for best performance.

3. Apparatus according to claim 1, wherein said control means controls said voltage applied to said bias input port of said Wideband Low Noise Amplifiers manually through instructions from a remote controller.

4. Apparatus according to claim 1, wherein said control means is capable of either automatic or manually commanded control of said voltage applied to said bias input port of said Wideband Low Noise Amplifiers.

5. An apparatus according to claim 1 wherein:
   said array includes first and second pairs of antenna—Wideband Low Noise Amplifier elements, said first pair of antenna—Wideband Low Noise Amplifier elements including two horizontally disposed antennas and said second pair of antenna—Wideband Low Noise Amplifier elements including two vertically disposed antennas, with said horizontally disposed antennas being mutually separated by at least 6 inches and said vertically disposed antennas being mutually separated by at least 6 inches, and wherein:
   said hybrid of said high-speed signal processor is coupled to receive signal from said vertically disposed antennas for generating sum and difference signals related to vertically polarized signals; and
   said high-speed signal processor includes a second hybrid coupled to receive signal from said horizontally disposed antennas for generating sum and difference signals related to horizontally disposed signals.

6. An apparatus according to claim 5 wherein:
   said high-speed signal processor includes at least two hybrids and two double-pole, double-throw (DPDT) electronically controlled switches;
   each pair of two integrated antenna—Wideband Low Noise Amplifiers is connected to a hybrid that provides either the sum or the difference of the individual signals of the integrated antenna—Wideband Low Noise Amplifier to the switch;
   the sum or difference signal is switched to one of (a) a third hybrid and (b) the tuner;
   and if said sum or difference signal is switched to said third hybrid, said third hybrid provides at its outputs sum and difference signals from the first and second hybrids, any one of which signals from said third hybrid can be coupled to the tuner.

7. Apparatus according to claim 6, wherein said signal processor may be (a) switched manually via a remote controller, (b) automatically via stored instructions, or (c) both to provide improved TV reception through optimum space and polarization diversity switching.

8. An apparatus according to in claim 5 in which the bias voltage to the Wideband Low Noise Amplifiers is automatically adjusted for best performance.

9. Apparatus according to claim 1 in which each Wideband Low Noise Amplifier is configured as one of (a) a single amplifier or as (b) a dual balanced amplifier.

10. A television receiving apparatus, comprising:
an input port for an external antenna;
a channel tuner having an input port for receiving image-representative signals:
an array of spaced-apart electronically integrated antenna—Wideband Low Noise Amplifier elements for image-representative radio-frequency received signals;
processing means coupled to said array for receiving image-representative radio-frequency signals therefrom, and coupled to said external antenna input port for receiving external signals therefrom, said processing means including at least one hybrid coupled to said array for generating sum and difference signals from said image-representative radio-frequency signals, said processing means also including switching means for selecting at least signals combined by said at least one hybrid, and for comparing signals originating from said array with signals applied to said input port for an external antenna to select that one signal which is superior according to at least one metric, and for coupling said one signal to said input port of said channel tuner.

11. A television receiving apparatus comprising:
a channel tuner including an input port for receiving image-representative signals;
an input port for receiving signals from an external source;
an associated antenna array, which may be one of an internal array and an associated indoor array, said antenna array including at least two electronically integrated antenna—Wideband Low Noise Amplifier elements;
a processor including a plurality of RE switches and at least one hybrid, for selectively generating a plurality of signals including sums and differences of signals from said antenna—Wideband Low Noise Amplifier elements, and for comparing said sums and differences with each other and with a signal applied to said input port for receiving signals from an external source to thereby select the best signal, and for coupling that selected best signal to the input port of the tuner.

* * * * *